(12) United States Patent
Hu

(10) Patent No.: US 12,231,868 B2
(45) Date of Patent: Feb. 18, 2025

(54) SOUND EFFECT ADJUSTMENT

(71) Applicant: Tencent Technology (Shenzhen) Company Limited, Guangdong (CN)

(72) Inventor: Feng Hu, Shenzhen (CN)

(73) Assignee: Tencent Technology (Shenzhen) Company Limited, Shenzhen (CN)

( * ) Notice: Subject to any disclaimer, the term of this patent is extended or adjusted under 35 U.S.C. 154(b) by 344 days.

(21) Appl. No.: 17/969,556

(22) Filed: Oct. 19, 2022

(65) Prior Publication Data
US 2023/0041730 A1 Feb. 9, 2023

Related U.S. Application Data

(63) Continuation of application No. PCT/CN2021/124963, filed on Oct. 20, 2021.

(30) Foreign Application Priority Data

Nov. 18, 2020 (CN) .......................... 202011293818.9

(51) Int. Cl.
*H04S 7/00* (2006.01)
*G06V 20/40* (2022.01)
*H04S 1/00* (2006.01)

(52) U.S. Cl.
CPC .............. *H04S 7/303* (2013.01); *G06V 20/40* (2022.01); *H04S 1/002* (2013.01); *H04S 7/307* (2013.01); *H04S 2420/01* (2013.01)

(58) Field of Classification Search
CPC .......... H04S 7/303; H04S 7/307; H04S 1/002; H04S 2420/01; G06V 20/40

USPC .......................................... 381/63, 300, 306
See application file for complete search history.

(56) References Cited

U.S. PATENT DOCUMENTS

| 10,032,447 B1* | 7/2018 | Kochanczyk ........ G11B 27/022 |
| 2003/0053680 A1 | 3/2003 | Lin et al. |

FOREIGN PATENT DOCUMENTS

| CN | 104036789 A | 9/2014 |
| CN | 107211230 A | 9/2017 |
| CN | 109327795 A | 2/2019 |
| CN | 109413563 A | 3/2019 |
| CN | 111095952 A | 5/2020 |
| CN | 111885414 A | 11/2020 |

(Continued)

OTHER PUBLICATIONS

Supplementary European Search Report issued in Application No. 21893667.2, mailed Dec. 19, 2023, 7 pages.

(Continued)

*Primary Examiner* — William A Jerez Lora
(74) *Attorney, Agent, or Firm* — ArentFox Schiff LLP

(57) ABSTRACT

A sound effect adjustment method is provided. In the method, a video frame and an audio signal of a corresponding time unit of a target video are obtained. A sound source orientation and a sound source distance of a sound source object in the video frame are determined. Scene information corresponding to the video frame is determined. The audio signal is filtered based on the sound source orientation and the sound source distance. An echo coefficient is determined according to the scene information. Further, an adjusted audio signal with an adjusted sound effect is generated based on the filtered audio signal and the echo coefficient.

20 Claims, 7 Drawing Sheets

(56) References Cited

FOREIGN PATENT DOCUMENTS

CN 112492380 A 3/2021
GB 2535143 A 8/2016

OTHER PUBLICATIONS

International Search Report and Written Opinion issued in International Application No. PCT/CN2021/124963, mailed Jan. 14, 2022, with English Translation, 11 pages.

* cited by examiner

SOUND EFFECT ADJUSTMENT

RELATED APPLICATIONS

The present application is a continuation of International Application No. PCT/CN2021/124963, entitled "SOUND EFFECT ADJUSTING METHOD AND APPARATUS, DEVICE, STORAGE MEDIUM, AND COMPUTER PROGRAM PRODUCT" and filed on Oct. 20, 2021, which claims priority to Chinese Patent Application No. 202011293818.9, entitled "SOUND EFFECT ADJUSTMENT METHOD AND APPARATUS, DEVICE, AND STORAGE MEDIUM" and filed on Nov. 18, 2020. The entire disclosures of the prior applications are hereby incorporated by reference in their entirety.

FIELD OF THE TECHNOLOGY

Embodiments of this application relate to the field of computer technologies, including to a sound effect adjustment method and apparatus, a device, a storage medium, and a computer program product.

BACKGROUND OF THE DISCLOSURE

With the increasing demand for video viewing, people have increasingly high requirements on the sound effect of voice in videos.

At present, the voice in videos is often configured at a later period, and because the voice is not completed in a real scene, a voice effect obtained by the configuration in the later period is may appear to be unrealistic.

SUMMARY

Embodiments of this disclosure include a sound effect adjustment method and apparatus, a device, a non-transitory computer-readable storage medium, and a computer program product. The embodiments can provide video sound effects with surround stereo and scene, thereby improving a presence feeling of a user. Exemplary technical solutions are further described below.

According to an aspect of the disclosure, a sound effect adjustment method is provided. In the method, a video frame and an audio signal of a corresponding time unit of a target video are obtained. A sound source orientation and a sound source distance of a sound source object in the video frame are determined. Scene information corresponding to the video frame is determined. The audio signal is filtered based on the sound source orientation and the sound source distance. An echo coefficient is determined according to the scene information. Further, an adjusted audio signal with an adjusted sound effect is generated by processing circuitry based on the filtered audio signal and the echo coefficient According to an aspect of the embodiments of this disclosure, a sound effect adjustment apparatus is provided.

The sound effect adjustment apparatus includes processing circuitry that is configured to obtain a video frame and an audio signal of a corresponding time unit of a target video. The processing circuitry is configured to determine a sound source orientation and a sound source distance of a sound source object in the video frame. The processing circuitry is configured to determine scene information corresponding to the video frame. The processing circuitry is configured to filter the audio signal based on the sound source orientation and the sound source distance. The processing circuitry is configured to determine an echo coefficient according to the scene information. Further, the processing circuitry is configured to generate an adjusted audio signal with an adjusted sound effect based on the filtered audio signal and the echo coefficient.

According to an aspect of the embodiments of this disclosure, a computer device is provided, including: a processor and a memory, the memory storing at least one instruction, at least one program, and a code set, or an instruction set, the at least one instruction, the at least one program, and the code set, or the instruction set being loaded and executed by the processor to implement the foregoing sound effect adjustment method.

In an example, the computer device is a terminal or a server.

According to an aspect of the embodiments of this disclosure, a non-transitory computer-readable storage medium is provided, the non-transitory computer-readable storage medium stores instructions which when executed by a processor cause the processor to implement the foregoing sound effect adjustment method.

According to an aspect of the embodiments of this disclosure, a computer program product or a computer program is provided, the computer program product or the computer program including computer instructions, the computer instructions being stored in a computer-readable storage medium. A processor of a computer device reads the computer instructions from the computer-readable storage medium, and executes the computer instructions, to cause the computer device to perform the foregoing sound effect adjustment method.

The technical solutions provided in the embodiments of this disclosure may include the following beneficial effects:

Surround stereo processing is performed on the audio signal based on the sound source orientation and the sound source distance, and then scene processing is performed on the audio signal according to the echo coefficient corresponding to the scene information, to obtain an audio signal having a sound effect with surround stereo and scene, thereby enhancing a sense of reality of the sound effect and further improving the presence feeling of the user.

BRIEF DESCRIPTION OF THE DRAWINGS

To describe the technical solutions in the embodiments of this disclosure more clearly, the following briefly introduces the accompanying drawings required for describing the embodiments. The accompanying drawings in the following description show merely some embodiments of this disclosure. Other embodiments are within the scope of this disclosure.

DESCRIPTION OF EMBODIMENTS

To make objectives, technical solutions, and advantages of this disclosure clearer, the following further describes in further detail implementations of this disclosure with reference to the accompanying drawings.

Before the embodiments of this disclosure are introduced and described, some terms related to the embodiments of this disclosure are first defined and described.

1. Sound Effect

Sound effect may refer to the effect produced by sound, which can show a sense of reality, atmosphere and information of the scene. The sound effect may be a natural sound effect such as rain, thunder, or wind. The sound effect may be an artificial sound effect such as music, machine, or video voice.

2. Stereo Sound

Stereo sound may refer to a sound effect with a sense of direction. Using an accompanying sound of a TV as an example, the TV makes sound from speakers on the left and right sides, and a sound field is established on a plane between the two speakers. In the sound field, audiences can feel a stereoscopic feeling of sound.

3. Surround Stereo Sound

Different from general stereo sound, the sound field generated by surround stereo sound for example not only makes people feel a sense of direction of the sound source, but also is accompanied by a feeling of being surrounded by sound and spreading away from the sound source. Surround stereo sound can enhance a sense of depth, presence and space of the sound. For example, surround stereo sound can create a sound effect of being in a karaoke bar and a theater.

The sound effect adjustment method provided in the embodiments of this disclosure is suitable for adjusting a video sound effect in various application scenarios, so that the video has a sound effect with surround stereo and scene. For example, the foregoing application scenarios include but are not limited to: a scenario where the video is played by a handheld device such as a mobile phone or a tablet computer, a scenario where the video is played by a large screen playback device such as a TV or a multimedia theater, a scenario where the video is played by a wearable device such as virtual reality (VR) glasses or a VR helmet. The sound effect adjustment solution provided in the embodiments of this disclosure may be used for voice adding of the video to increase the sense of reality of the voice sound effect, or may be used for processing an audio signal of the video in real time when the video is played by a video player, to enhance the sense of reality of the video sound effect.

Figure 1:
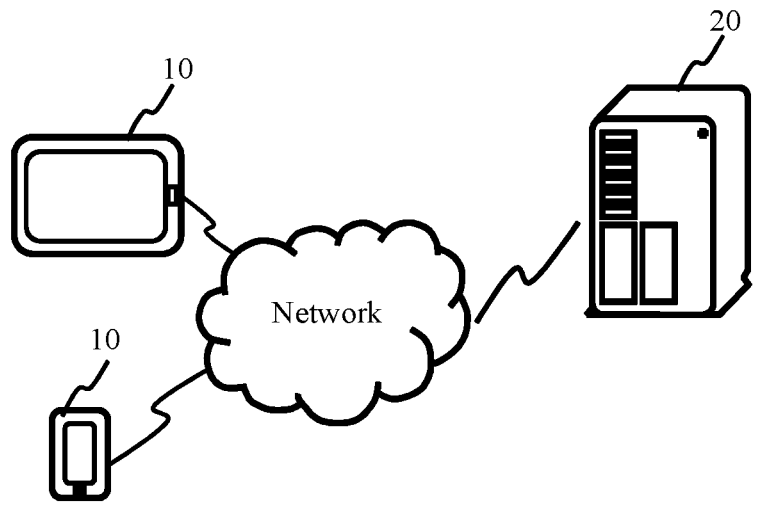
FIG. 1 is a schematic diagram of a solution implementation environment according to an embodiment of this disclosure.

In an example, using a scenario where the video is played by a handheld device as an example, a system architecture in the application scenario may be shown in FIG. 1, and includes a terminal 10 and a server 20.

The terminal 10 may be an electronic device such as a mobile phone, a tablet computer, or a wearable device. An application client having a video playback function is installed and run in the terminal 10, and the application client may have a video player for decoding and playing the video.

The server 20 may be an independent physical server, or may be a server cluster including a plurality of physical servers or a distributed system, or may be a cloud server that provides cloud computing services.

The sound effect adjustment method provided in the embodiments of this disclosure may be performed by the terminal 10 (e.g., processing an audio signal of a video in real time), or performed by the server 20 (e.g., adding voice of the video). This is not limited in the embodiments of this disclosure.

In the sound effect adjustment method provided in the embodiments of this disclosure, steps may be performed by a computer device, and the computer device refers to as an electronic device with data calculation, processing, and storage capabilities. The computer device may be a terminal such as a personal computer (PC), a tablet computer, a smartphone, a smart TV, a wearable device, or an intelligent robot. The steps may alternatively be performed by the server.

In an exemplary embodiment, the sound effect adjustment method provided in the embodiments of this disclosure may adopt some artificial intelligence (AI) technologies to assist in the sound effect adjustment. For example, the AI technologies include a computer vision (CV) technology and a machine learning (ML) technology.

Artificial intelligence includes a theory, method, technology, and application system that uses a digital computer or a machine controlled by the digital computer to simulate, extend, and expand human intelligence, perceive an environment, acquire knowledge, and use knowledge to obtain an optimal result. In other words, AI is a comprehensive technology in computer science. This technology attempts to understand the essence of intelligence and produce a new intelligent machine that can react in a manner similar to human intelligence. AI is to study the design principles and implementation methods of various intelligent machines, so that the machines can perceive, infer, and make decisions.

The AI technology is a comprehensive subject, relating to a wide range of fields, and involving both hardware and software techniques. Basic AI technologies generally comprise technologies such as a sensor, a dedicated AI chip, cloud computing, distributed storage, a big data processing technology, an operating/interaction system, and electromechanical integration. An AI software technology mainly comprises fields such as a CV technology, a speech processing technology, a natural language processing technology, and machine learning/deep learning (DL).

The CV technology includes a science that studies how to use a machine to "see", and furthermore, that uses a camera and a computer to replace human eyes to perform machine vision such as recognition, tracking, and measurement on an object, and further perform graphic processing, so that the computer processes the object into an image more suitable for human eyes to observe, or an image transmitted to an instrument for detection. As a scientific discipline, the CV studies related theories and technologies and attempts to establish an AI system that can obtain information from images or multidimensional data. The CV technology generally includes technologies such as image processing, image recognition, image semantic understanding, image retrieval, optical character recognition (OCR), video processing, video semantic understanding, video content/behavior recognition, three-dimensional object reconstruction, a 3D technology, virtual reality (VR), augmented reality (AR), synchronous positioning, and map construction, and further include biological feature recognition technologies such as common face recognition and fingerprint recognition.

ML includes a multi-field interdisciplinary subject involving the probability theory, statistics, the approximation theory, convex analysis, the algorithm complexity theory, and the like. ML specializes in studying how a computer simulates or implements a human learning behavior to acquire new knowledge or skills, and reorganize an existing knowledge structure, so as to keep improving its performance. The ML is the core of the AI, is a basic way to make the computer intelligent, and is applied to various fields of AI. The ML and deep learning generally comprise technologies such as an artificial neural network, a belief network, reinforcement learning, transfer learning, inductive learning, and learning from demonstrations.

For example, in the sound effect adjustment method provided in the embodiments of this disclosure, a video frame can be recognized by using the CV technology. Scene information, face pose, and depth information corresponding to the video frame can be recognized by using machine learning.

The technical solutions provided in the embodiments of this disclosure are described below by using several exemplary embodiments.

Figure 2:
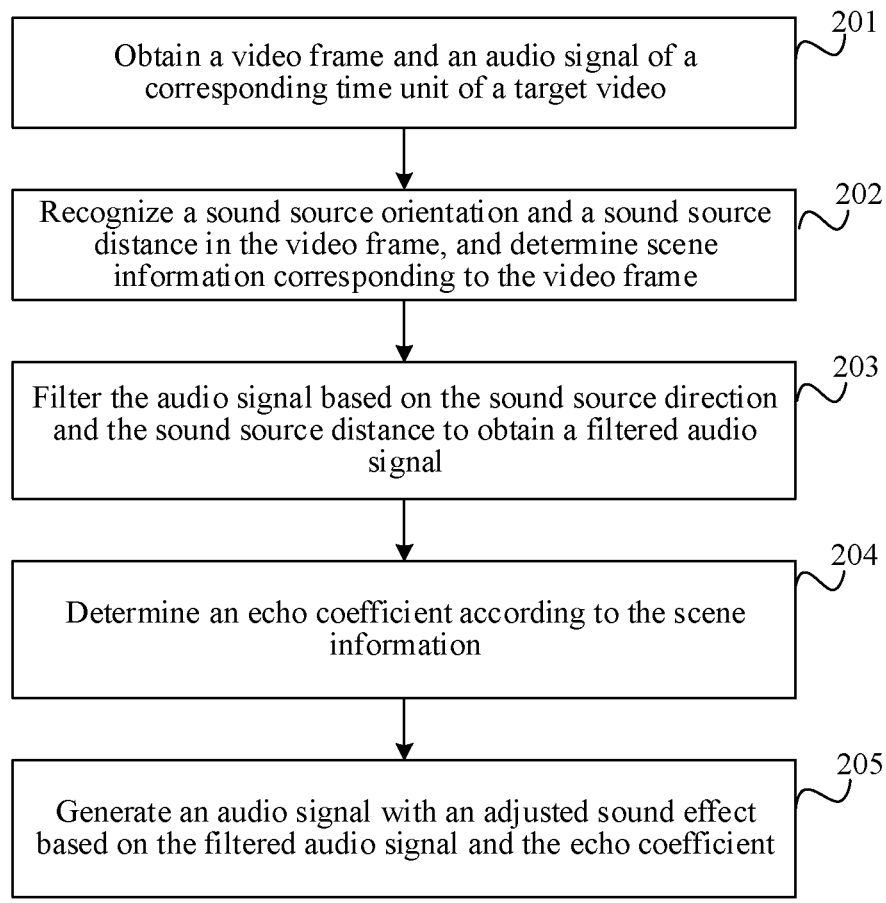
FIG. 2 is a flowchart of a sound effect adjustment method according to an embodiment of this disclosure.

FIG. 2 is a flowchart of a sound effect adjustment method according to an embodiment of this disclosure. Steps of the method may be performed by the server 20 (or the terminal 10) in the implementation environment shown in FIG. 1, and the method may include the following steps (201-205):

In step 201, a video frame and an audio signal of a corresponding time unit of a target video are obtained.

In this embodiment of this disclosure, the target video refers to a video that requires sound effect adjustment. For example, the target video may be any video that requires voice sound effect adjustment. In an example, the target video may include a video that has been recorded, such as a movie or a TV drama, or the target video may include a video being recorded, such as a movie and a TV drama being recorded, a video displayed in real time by a VR device, or a video in real-time video communication. This is not limited in the embodiments of this disclosure.

In an example, the target video may include a video frame and an audio signal, and a correspondence between the video frame and the audio signal in the target video is formed on a time unit. For example, in a time unit A, a video A includes a video frame B and an audio signal C corresponding to the video frame B. The video frame refers to a still image in the video. The audio signal refers to an analog sound wave signal in a time domain of the video.

In an example, a specific manner of obtaining the audio signal corresponding to the video frame may include the following steps: obtaining a video frame sequence and an audio file of the target video, where the video frame sequence includes a plurality of video frames sequentially arranged in the time domain; and capturing, for each video frame, an audio signal in a time unit corresponding to the video frame from the audio file, to obtain the audio signal corresponding to the video frame. For example, if the video frame sequence in the video A includes 300 video frames, and one video frame is switched every 15 milliseconds, a time unit corresponding to the first video frame is 0 to 15 milliseconds, and a time unit corresponding to the second video frame is 15 to 30 milliseconds. An audio signal in the time unit corresponding to the first video frame is an audio signal within 0 to 15 milliseconds in the audio file, and an audio signal in the time unit corresponding to the second video frame is an audio signal within 15 to 30 milliseconds in the audio file.

The audio file includes audio signals that are consecutive in the time domain. The computer device may capture a corresponding audio signal from the audio file according to the time unit.

In step 202, a sound source orientation and a sound source distance are recognized from the video frame, and scene information corresponding to the video frame is determined.

The sound source orientation may refer to a direction of the audio signal emitted from a sound source. The sound source may include an animal (e.g., a bird, cat, or dog), a character, a natural environment, and a sounding device. For example, if the sound source is a human mouth, the sound source orientation can be determined according to the orientation of the human mouth, that is, the sound source orientation can be used for representing a propagation direction of the audio signal for recording a sound wave. In this embodiment of this disclosure, the sound source orientation may refer to a direction of the audio signal emitted by the sound source in a video frame obtained by using a screen (or a camera shooting the target video) as a reference position, or the sound source orientation may refer to a direction of the audio signal emitted by the sound source in a video frame obtained by using a user (e.g., a video viewer) as a reference position. The sound source orientation is not limited in the embodiments of this disclosure.

In an example, a sound source distance refers to a distance from the sound source to a receiving place. The receiving place may include a sound pickup device (e.g. a head recorder), human ears, animal ears, and the like. For example, if the receiving place is human ears, the sound source distance is a distance from the sound source to the human ears. In an example, the distance from the sound source to left ear and right ear of a person is different, and the orientation is different. In this embodiment of this disclosure, the sound source distance may refer to a distance between a sound source in the video frame and the screen (or a camera shooting the target video), or the sound source distance may refer to a distance between a sound source and a user (e.g. a video viewer) in the video frame. The sound source distance is not limited in the embodiments of this disclosure.

Figure 3:
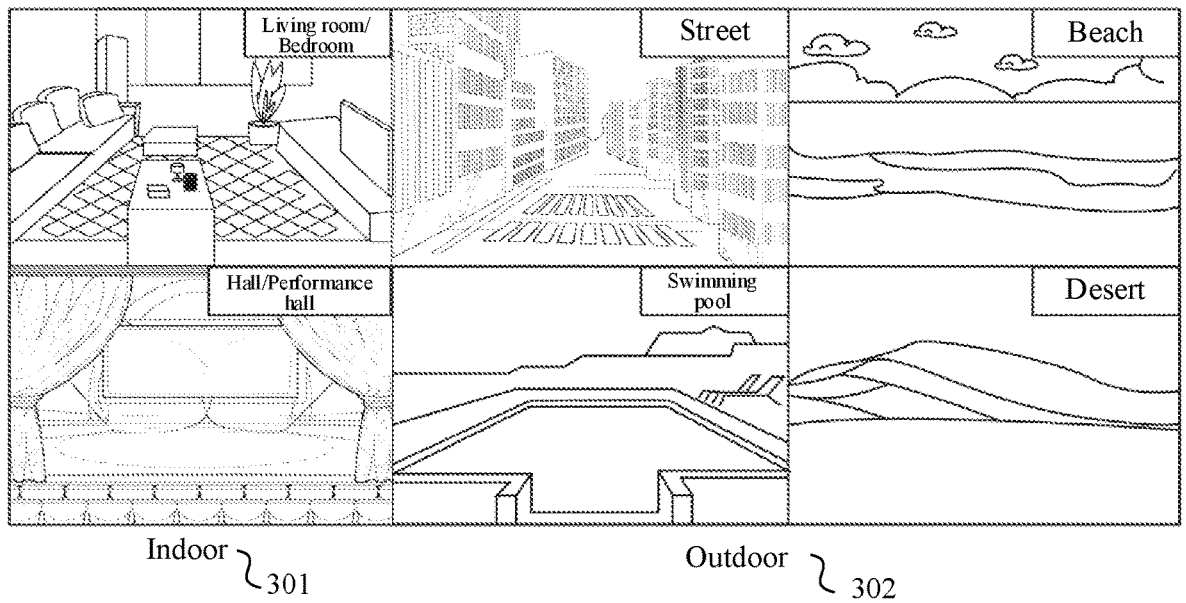
FIG. 3 is a schematic diagram of scene information according to an embodiment of this disclosure.

In an example, the scene information refers to information of a scene displayed by picture content corresponding to the video frame. For example, referring to FIG. 3, the scene information may include an indoor scene 301 and an outdoor scene 302. The indoor scene 301 may include a bedroom, a performance hall, a classroom, an office, and the like. The outdoor scene 302 may include an urban scene such as a street or a swimming pool, or the outdoor scene 302 may include a natural scene such as a beach or a desert.

In an example, a specific manner of obtaining the sound source orientation and the sound source distance may be as follows: determining a sound source object in the video frame; performing pose recognition on the sound source object to obtain pose information of the sound source object; determining the sound source orientation based on the pose information; and determining the sound source distance based on depth information of the sound source object.

The sound source object in the video frame refers to the sound source included in the picture content corresponding to the video frame. For example, in a case that the sound source object is a character, face pose recognition processing may be performed on the character to obtain face pose information of the character. The face pose information refers to different orientation information of the face, such as lowering the head, raising the head, and turning the face aside. The sound source orientation may be determined according to the face pose information of the character. The sound source object may be determined according to a mouth movement of the character.

Figure 4:
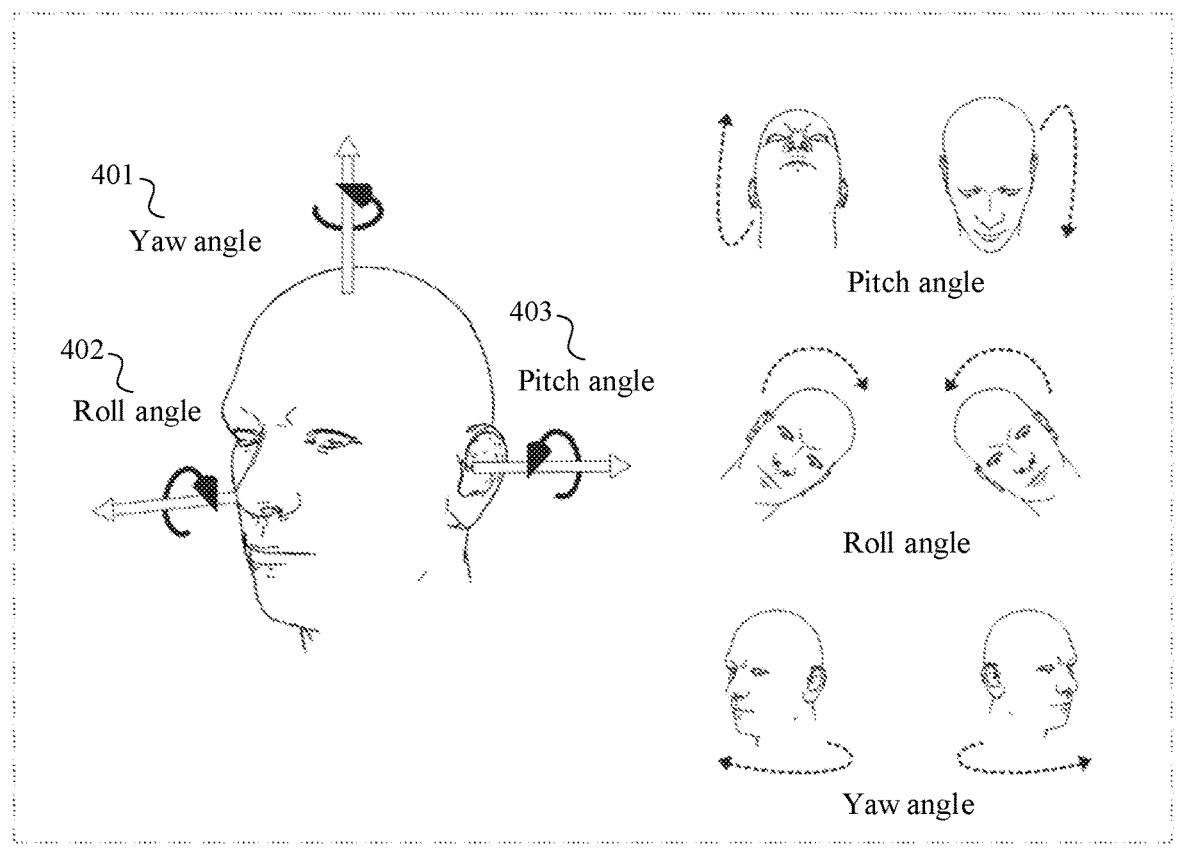
FIG. 4 is a schematic diagram of a face orientation according to an embodiment of this disclosure.

For example, in a case that the pose information includes the face pose information used for representing a face orientation, the face orientation represented by the face pose information may be determined as the sound source orientation. In this embodiment of this disclosure, "face pose information" may also be understood as "face pose". In an example, the face pose recognition can be implemented by using a deep neural network. The video frame may be inputted into a trained depth neural network to obtain an orientation of the face (e.g., a face orientation). In an example, positions of feature points such as eyes (e.g., left eye and right eye), nose, and mouth (e.g., left end and right end of the mouth) in a face region can be obtained by face detection and face feature point detection based on the deep neural network, and then the face orientation (e.g., the sound source orientation and a parameter related to the sound source orientation (e.g., an angle) can be determined based on a mutual relationship between the positions of the feature points. In an example, in some other embodiments, 68 feature points in the face region can be obtained by the face detection and the face feature point detection based on the depth neural network, to determine the face orientation more accurately. Referring to FIG. 4, the face orientation can be described from three angles: a yaw angle 401, a roll angle 402, and a pitch angle 403, and the sound source orientation can be determined based on the yaw angle 401, the roll angle 402, and the pitch angle 403 of the human face.

In an example, face pose recognition can also be implemented by using a method based on a local binary pattern (LBP) or a local ternary pattern (LTP) feature or feature point matching. The face pose recognition method is not limited in the embodiments of this disclosure.

Figure 5:
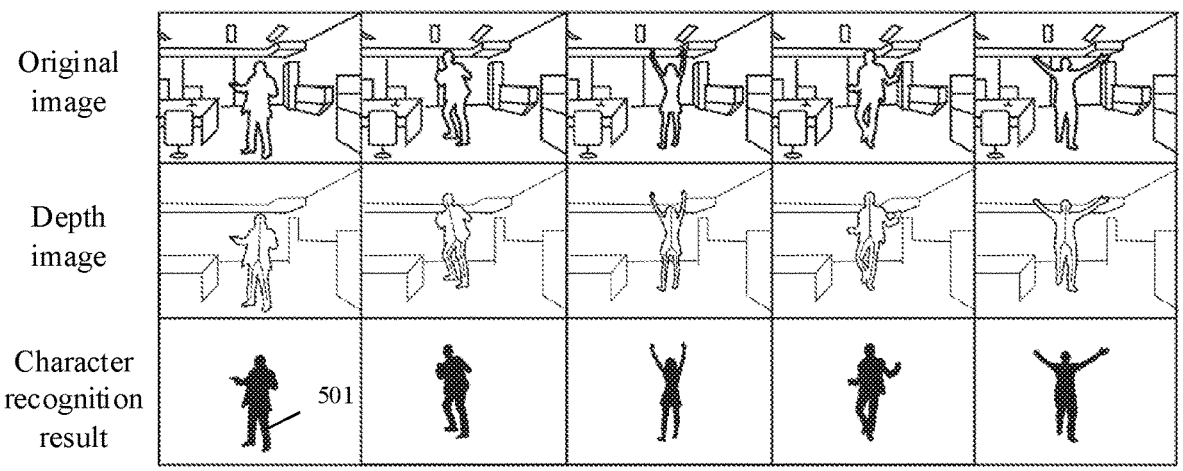
FIG. 5 is a schematic diagram of depth information according to an embodiment of this disclosure.

In an example, the depth information includes a depth value of the picture content corresponding to the video frame. The depth value may be used for representing a distance between each pixel and the camera (or the screen) in the picture content. For example, the distance between the sound source object and the screen (e.g., a sound source distance) can be determined based on the depth value of the sound source object. For example, referring to FIG. 5, a depth image corresponding to the video frame is obtained based on an original image corresponding to the video frame, and a character recognition result 501 is obtained from the depth image corresponding to the video frame. The depth value of the character recognition result 501 can be distinguished from a depth value of another object in the video frame to form an outline of the character, and then a distance between the character recognition result 501 and the camera can be calculated based on the depth value of the character recognition result 501. In an example, simultaneous localization and mapping (SLAM) can also be used for 3D reconstruction of the video frame. In a 3D reconstruction process of a scene corresponding to the video frame, the sound source object can be located in a reconstructed scene through SLAM, and then the distance between the sound source object and the camera (or the screen), that is, the sound source distance, can be obtained.

In an example, in a case that the depth information is recorded during video recording, depth information corresponding to the video frame can be determined by binocular ranging or multi-visual ranging, and the depth information corresponding to the video frame can be determined by using a device such as a laser ranging device or a structured light device. This is not limited in the embodiments of this disclosure. In a case that the depth information is not recorded during video recording, the depth information corresponding to the video frame can be obtained from the picture content of the video frame based on the deep neural network.

In step 203, the audio signal is filtered based on the sound source orientation and the sound source distance to obtain a filtered audio signal.

In this embodiment of this disclosure, filtering the audio signal refers to performing filtering such as air filtering, environmental reverberation, human scattering, human reflection on the audio signal by simulating a real propagation process of the sound. In an example, filtering may be implemented by using an HRTF. For example, an audio signal with a surround stereo sound effect can be obtained by processing the audio signal with the HTRF. In an example, the audio signal can be further optimized by the HRTF based on the sound source orientation and the sound source distance corresponding to the video frame, to obtain a more real surround stereo sound effect of the audio signal.

A specific training method of the HTRF may include the following steps: preparing a human head model including a built-in microphone, playing an original sound source in a certain spatial position, and comparing a sound recorded by the microphone with the original sound source, so that the HRTF can be obtained by training. Since the human ears have limited sensitivity to the perception of a direction of a sound source control, it is only necessary to select about 1000 sample points on the space sphere for measurement.

In an example, the HRTF has completed the function training in the training process, and an HRTF corresponding to the video frame (e.g., the filter function below) can be obtained only based on the sound source orientation and the sound source distance corresponding to the video frame. The HRTF corresponding to the video frame can be represented by a function H (f, d, θ) (e.g., the filter function below), where f is frequency domain information, f can be extracted through an audio signal on which Fourier transform has been performed, d is the sound source distance, and θ is the sound source orientation.

In an example, time-frequency transform can be performed on the audio signal, to obtain a frequency domain signal corresponding to the audio signal; a filter function is determined based on the frequency domain signal, the sound source orientation, and the sound source distance; and the audio signal is filtered through the filter function to obtain the filtered audio signal.

In an example, a determining manner of the filter function may further include: performing parameter adjustment on a set left channel filter function to obtain an adjusted left channel filter function based on the frequency domain signal, the sound source orientation, and the sound source distance; and performing parameter adjustment on a set right channel filter function to obtain an adjusted right channel filter function based on the frequency domain signal, the sound source orientation, and the sound source distance.

In an example, an audio signal emitted from a left channel can be filtered through the adjusted left channel filter function, to obtain a filtered audio signal corresponding to the left channel; and an audio signal emitted from a right channel can be filtered through the adjusted right channel filter function, to obtain a filtered audio signal corresponding to the right channel.

Figure 6:
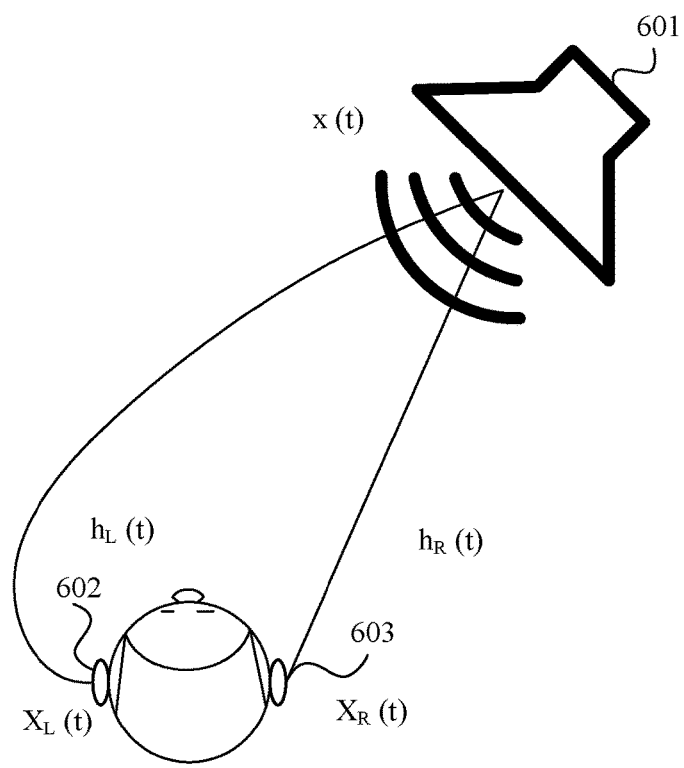
FIG. 6 is a schematic diagram of a head related transfer function (HRTF) according to an embodiment of this disclosure.

The set left channel filter function and the set right channel filter function are obtained by the HRTF in the training process. In an example, the set left channel filter function is a filter function for imitating transmission of the audio signal to the left ear, and the set right channel filter function is a filter function for imitating transmission of the audio signal to the right ear. For example, referring to FIG. 6, a process of propagation of the audio signal emitted from the sound source 601 to the left ear 602 is different from a process of propagation to the right ear 603, that is, filter functions of the two are different.

Figure 7:
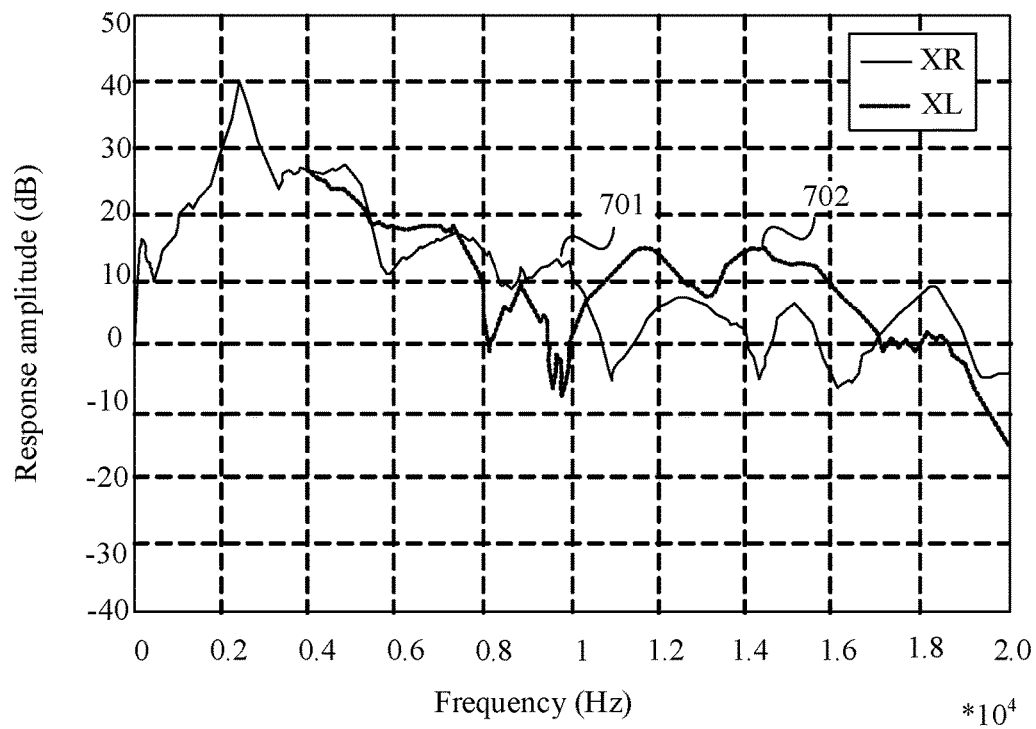
FIG. 7 is a schematic diagram of response information in different frequencies according to an embodiment of this disclosure.

For example, referring to FIG. 7, filtered audio signals corresponding to different channels have different response amplitudes in a frequency domain. A response amplitude curve 701 corresponding to the left channel and a response amplitude curve 702 corresponding to the right channel are similar in a frequency domain stage corresponding to an initial propagation process, and vary in a frequency domain corresponding to a subsequent propagation process due to different positions of the left ear and the right ear relative to the sound source.

In step 204, an echo coefficient is determined according to the scene information.

In an example, the echo coefficient is used for representing an echo effect. In different scene information, the sound has different echo effects. For example, in a spacious field scene, the sound has almost no echo effect. In a mountain scene, the sound has an obvious echo effect. In an example, the echo coefficient may include at least a delay coefficient, a loudness coefficient, and the like. The delay coefficient is used for representing an echo interval of the sound. The loudness coefficient is used for representing attenuation of echo loudness of the sound.

In an example, a specific obtaining method of the echo coefficient may include the following steps: obtaining depth information corresponding to the video frame; obtaining a set echo coefficient corresponding to the scene information based on a preset correspondence, where the preset correspondence includes a correspondence between at least one group of scene information and the set echo coefficient; and fine-tuning the set echo coefficient corresponding to the scene information based on the depth information to obtain the echo coefficient.

Figure 8:
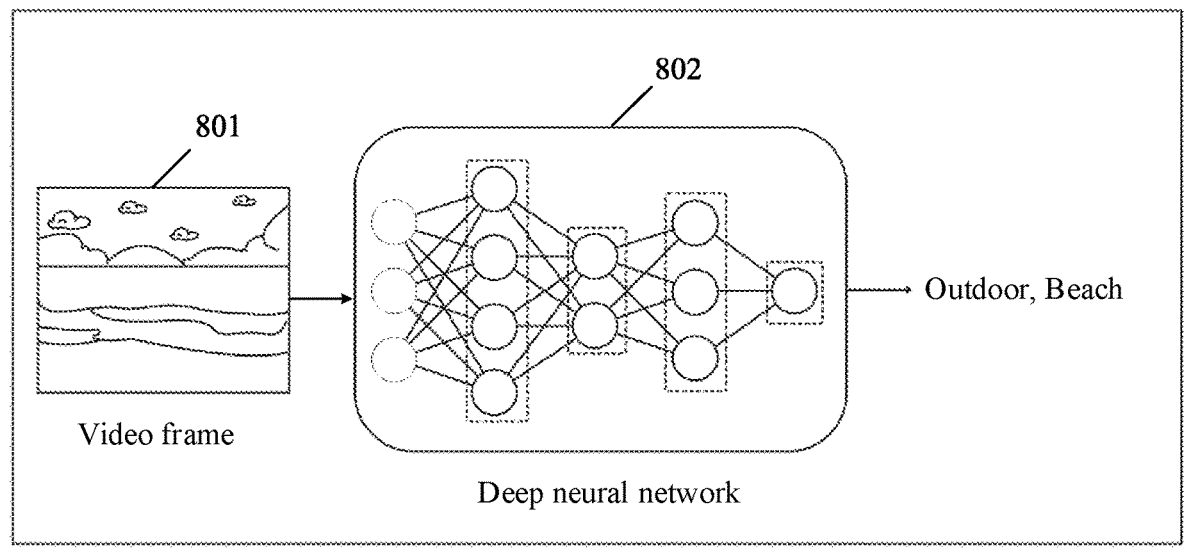
FIG. 8 is a schematic diagram of scene information acquisition according to an embodiment of this disclosure.

The echo coefficient is an echo coefficient corresponding to a certain scene. For example, if the scene information in the video frame A is indoor, the set echo coefficient is an echo coefficient corresponding to the indoor scene, but the set echo coefficient is rough data and is not accurately determined based on a distance between the indoor scene and the sound source object. The preset correspondence is a correspondence between the scene information and the echo coefficient. For example, referring to FIG. 8, scene information corresponding to a video frame 801 can be recognized from the video frame 801 according to a deep neural network 802, and a corresponding echo coefficient can be obtained from the preset correspondence according to the scene information. In an example, scene recognition can be performed by using a net vector of locally aggregated descriptors (NetVLAD) vector retrieval.

In an example, since echo has a scattering effect, and echo gives people a feeling of coming from all directions, the impact of direction can be ignored during adjustment of the set echo coefficient. For example, for the outdoor scene, there is generally no need to obtain a precise echo coefficient, that is, there is no need to fine-tune the set echo coefficient. For an indoor or a cave scene, in order to create a sense of reality of the scene, the set echo coefficient needs to be fine-tuned. In an example, the propagation speed of a sound wave is 340 m/s, and the human ears can distinguish the echo after 0.1 s. Therefore, in the indoor scene, if an edge between the human and the indoor scene exceeds 17 m, the echo coefficient needs to be calculated.

For a simple scene, the set echo coefficient can be fine-tuned based on a distance between the sound source object and the indoor edge (e.g., the wall) to obtain the echo coefficient. For a complex scene (e.g., a cave with repeated echoes), the set echo coefficient can be fine-tuned to obtain the echo coefficient based on the distance between the sound source object and the indoor edge (e.g., the wall), and in combination with the amplitude and delay of each echo obtained from simulation calculation, to obtain the echo coefficient.

In an example, an adjustment method of the echo coefficient may include the following steps: determining a distance and an angle between a sound source object in the video frame and each pixel in a picture content corresponding to the video frame based on depth information of the video frame; and then fine-tuning a set echo coefficient corresponding to the scene information based on the distance and the angle to obtain the echo coefficient.

For example, a room scene is used as an example. According to the distance and the angle between the sound source object and the wall, the amplitude and delay of each echo can be calculated by simulation, and then the set echo coefficient corresponding to the room scene can be fine-tuned based on the distance and the angle between the sound source object and the wall, and the amplitude and delay of each echo, to obtain the echo coefficient.

The echo coefficient is related to a spatial distance. For example, a larger space in a room indicates a larger echo coefficient. Therefore, SLAM can also be used to perform 3D reconstruction on a scene corresponding to the video frame, and obtain a spatial distance structure corresponding to the scene, and then determine an echo coefficient corresponding to the scene according to the spatial distance structure corresponding to the scene.

In step 205, an audio signal with an adjusted sound effect is generated based on the filtered audio signal and the echo coefficient.

In an example, echo generation can be performed on the filtered audio signal according to the echo coefficient, to obtain echo effect information; and the audio signal with the adjusted sound effect is generated based on the echo effect information and the filtered audio signal.

The echo effect information is used for simulating an echo effect in a real scene. For example, if the scene information corresponding to the video frame is a mountain, an echo effect of the mountain can be sound with different loudness with a time interval. The audio signal can be processed into echo effect information with different loudness with the time interval according to the echo coefficient. Then, the echo effect information is combined with the filtered audio signal corresponding to the video frame to generate an audio signal having an echo effect.

In an example, in a case that the echo coefficient includes a delay parameter, an amplitude parameter, and a direction parameter, an obtaining method of echo effect information is as follows: determining echo delay effect information of the filtered audio signal based on the delay parameter; determining echo amplitude effect information of the filtered audio signal based on the amplitude parameter; and determining echo direction effect information of the filtered audio signal based on the direction parameter.

The echo delay effect information is used for representing a delay effect of an echo of the target video, and the delay parameter can be obtained through calculation in combination with depth information and a sound propagation speed. The echo amplitude effect information is used for representing a loudness attenuation effect of the echo of the target video, and the amplitude (e.g., the loudness) can be obtained through simulation based on a real scene corresponding to the scene information of the target video. The echo direction effect information is used for representing a direction effect of the echo of the target video, and the direction parameter can be all directions.

In an example, a generation method of the audio signal with the adjusted sound effect may include the following steps: generating an echo audio signal corresponding to the filtered audio signal based on the echo delay effect information, the echo amplitude effect information, and the echo direction effect information; and superimposing the echo audio signal on the filtered audio signal to generate the audio signal with the adjusted sound effect.

For example, an echo audio signal having a direction, a delay and an amplitude can be obtained based on the echo coefficient and the filtered audio signal, and finally an audio signal having an echo effect can be obtained by superimposing the echo audio signal on the filtered audio signal.

Based on the above, according to the technical solutions provided in the embodiments of this disclosure, surround stereo processing is performed on the audio signal based on the sound source orientation and the sound source distance, and then scene processing is performed on the audio signal according to the echo coefficient corresponding to the scene information, to obtain an audio signal having a sound effect with surround stereo and scene, thereby enhancing a sense of reality of the sound effect and further improving the presence feeling of the user.

In addition, through the HRTF function, the surround stereo of the audio signal is more real based on the sound source orientation and the sound source distance corresponding to the video frame.

In addition, an accurate echo coefficient is obtained based on the scene information and the depth information corresponding to the video frame, so that a scene effect of the audio signal is more real through the accurate echo coefficient.

Figure 9:
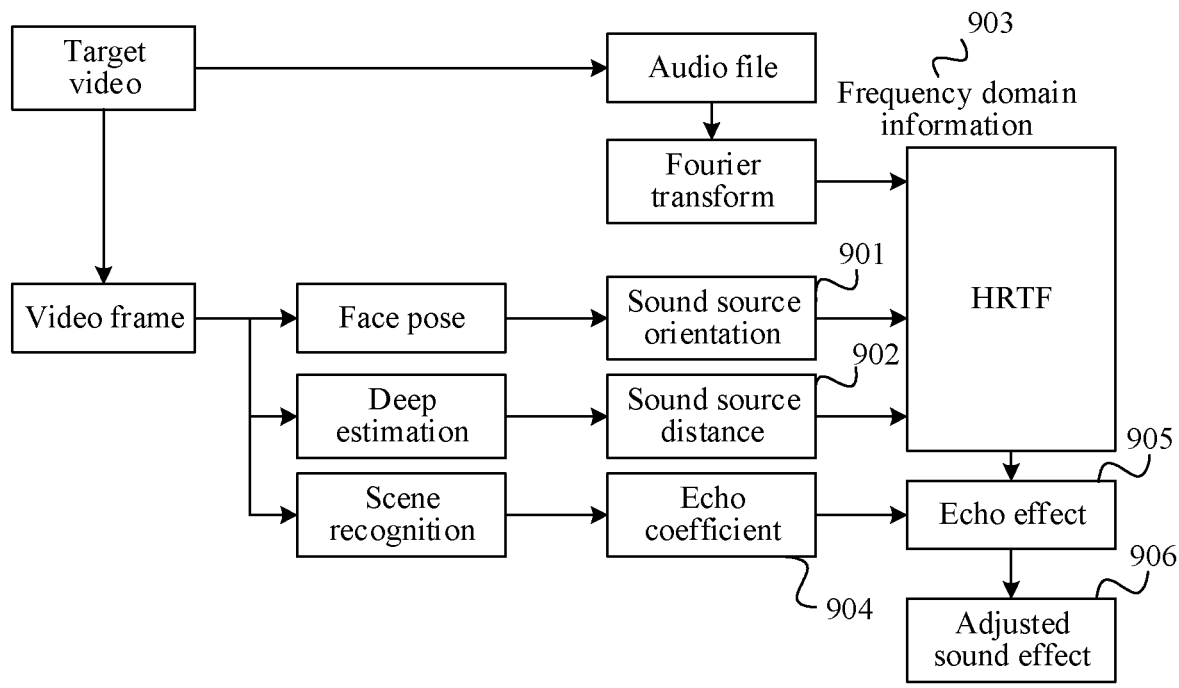
FIG. 9 is a schematic diagram of a sound effect adjustment method according to another embodiment of this disclosure.

In an exemplary embodiment, FIG. 9 is a flowchart of a sound effect adjustment method according to another embodiment of this disclosure. Specific content of the method may include the following steps:

1. Obtain a sound source orientation 901 through a face pose model based on a video frame of a target video.

For example, the sound source orientation corresponding to the target video frame is obtained through the face pose model based on a target video frame corresponding to the target video. The target video frame may be any video frame of the target video frame, and the face pose model may refer to a trained deep neural network.

2. Obtain a sound source distance 902 through a deep estimation model based on the video frame of the target video.

For example, the sound source distance corresponding to the target video frame is obtained through the deep estimation model based on the target video frame. The deep estimation model may refer to the trained deep neural network.

3. Perform Fourier transform on a sound file of the target video to obtain frequency domain information 903.

For example, frequency domain information corresponding to the target video frame is obtained from the frequency domain information 903 based on a time unit corresponding to the target video frame.

4. Obtain a filtered sound file through an HRTF based on the frequency domain information 903, the sound source orientation 901, and the sound source distance 902.

For example, a filtered audio signal corresponding to the target video frame is obtained through the HRTF based on the frequency domain information, the sound source orientation, and the sound source distance corresponding to the target video frame.

5. Recognize a scene corresponding to the video frame through a scene recognition model according to the video frame of the target video, and then obtain an echo coefficient 904 according to the recognized scene.

For example, for the target video frame, the scene recognition is performed on the target video frame through the scene recognition model, to obtain scene information corresponding to the target video frame, and then an echo coefficient corresponding to the target video frame is obtained based on the scene information corresponding to the target video frame.

6. Perform echo generation on the filtered sound file through the echo coefficient 904 to generate an echo effect sound file 905.

For example, the echo generation is performed on the filtered audio signal corresponding to the target video frame through the echo coefficient corresponding to the target video frame, to generate an echo effect corresponding to the target video frame.

7. Obtain an adjusted sound file 906 according to the echo effect sound file 905 and the filtered sound file.

For example, the adjusted audio signal corresponding to the target video frame is obtained according to the echo effect corresponding to the target video frame and the filtered audio signal corresponding to the target video frame. In an example, all adjusted audio signals corresponding to the target video are combined according to a time sequence to obtain the adjusted sound file corresponding to the target video.

The following are apparatus embodiments of this disclosure, which can be used for performing the method embodiments of this disclosure. For details not disclosed in the apparatus embodiments of this disclosure, refer to the method embodiments of this disclosure.

Figure 10:
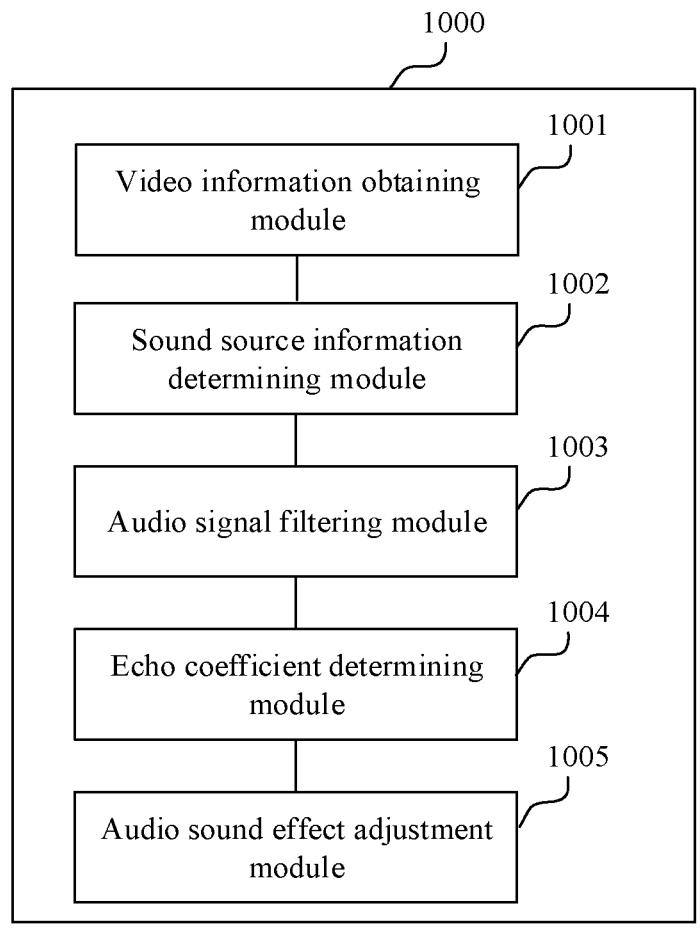
FIG. 10 is a block diagram of a sound effect adjustment apparatus according to an embodiment of this disclosure.

FIG. 10 is a block diagram of a sound effect adjustment apparatus according to an embodiment of this disclosure. The apparatus has a function of implementing the above method example, and the function may be implemented by hardware or by hardware executing corresponding software. The apparatus may be the computer device described above, or may be disposed in the computer device. As shown in FIG. 10, the apparatus 1000 includes: a video information obtaining module 1001, a sound source information determining module 1002, an audio signal filtering module 1003, an echo coefficient determining module 1004, and an audio sound effect adjustment module 1005. One or more modules, submodules, and/or units of the apparatus can be implemented by processing circuitry, software, or a combination thereof, for example.

The video information obtaining module 1001 is configured to obtain a video frame and an audio signal of a corresponding time unit of a target video.

The sound source information determining module 1002 is configured to recognize a sound source orientation and sound source distance from the video frame, and determine scene information corresponding to the video frame.

The audio signal filtering module 1003 is configured to filter the audio signal based on the sound source orientation and the sound source distance to obtain a filtered audio signal.

The echo coefficient determining module 1004 is configured to determine an echo coefficient according to the scene information.

The audio sound effect adjustment module 1005 is configured to generate an audio signal with an adjusted sound effect based on the filtered audio signal and the echo coefficient.

Figure 11:
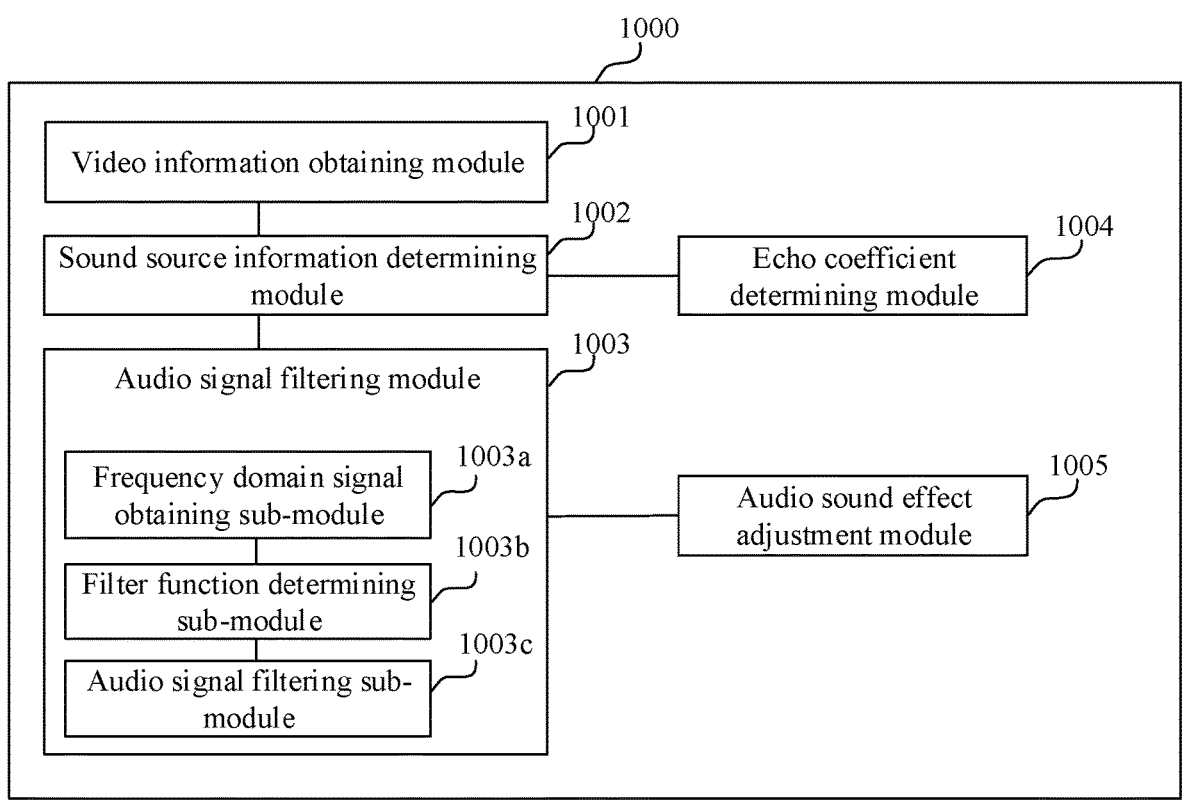
FIG. 11 is a block diagram of a sound effect adjustment apparatus according to another embodiment of this disclosure.

In an exemplary embodiment, as shown in FIG. 11, the audio signal filtering module 1003 includes: a frequency domain signal obtaining sub-module 1003a, a filter function determining sub-module 1003b, and an audio signal filtering sub-module 1003c.

The frequency domain signal obtaining sub-module 1003a is configured to perform time-frequency transform on the audio signal, to obtain a frequency domain signal corresponding to the audio signal.

The filter function determining sub-module 1003b is configured to determine a filter function based on the frequency domain signal, the sound source orientation, and the sound source distance.

The audio signal filtering sub-module 1003c is configured to filter the audio signal through the filter function to obtain the filtered audio signal.

In an exemplary embodiment, the filter function determining sub-module 1003b is configured to:
perform parameter adjustment of a set left channel filter function based on the frequency domain signal, the sound source orientation, and the sound source distance, to obtain an adjusted left channel filter function; and
perform parameter adjustment of a set right channel filter function based on the frequency domain signal, the sound source orientation, and the sound source distance, to obtain an adjusted right channel filter function.

The audio signal filtering module 1003 is further configured to:
filter an audio signal emitted from a left channel through the adjusted left channel filter function to obtain a filtered audio signal corresponding to the left channel; and
filter an audio signal emitted from a right channel through the adjusted right channel filter function to obtain a filtered audio signal corresponding to the right channel.

In an exemplary embodiment, the audio signal adjustment module 1005 is configured to:
perform echo generation on the filtered audio signal according to the echo coefficient, to obtain echo effect information; and
generate the audio signal with the adjusted sound effect based on the echo effect information and the filtered audio signal.

In an exemplary embodiment, the echo coefficient includes a delay parameter, an amplitude parameter, and a direction parameter. The audio sound effect adjustment module 1005 is further configured to:
determine echo delay effect information of the filtered audio signal based on the delay parameter, where the echo delay effect information is used for representing a delay effect of an echo of the target video;
determine echo amplitude effect information of the filtered audio signal based on the amplitude parameter, where the echo amplitude effect information is used for representing a loudness attenuation effect of the echo of the target video;
determine echo direction effect information of the filtered audio signal based on the direction parameter, where the echo direction effect information is used for representing a direction effect of the echo of the target video;

In an exemplary embodiment, the audio sound effect adjustment module 1005 is further configured to:
generate an echo audio signal corresponding to the filtered audio signal based on the echo delay effect information, the echo amplitude effect information, and the echo direction effect information; and
superimpose the echo audio signal on the filtered audio signal to generate the audio signal with the adjusted sound effect.

In an exemplary embodiment, the echo coefficient determining module 1004 is configured to:
obtain depth information corresponding to the video frame;
obtain a set echo coefficient corresponding to the scene information based on a preset correspondence, where the preset correspondence includes a correspondence between at least one group of scene information and the set echo coefficient; and
fine-tune the set echo coefficient corresponding to the scene information based on the depth information to obtain the echo coefficient.

In an exemplary embodiment, the echo coefficient determining module 1004 is further configured to:
determine a distance and an angle between a sound source object in the video frame and each pixel in a picture content corresponding to the video frame based on the depth information; and
fine-tune the set echo coefficient corresponding to the scene information based on the distance and the angle, to obtain the echo coefficient.

In an exemplary embodiment, the sound source information determining module 1002 is configured to:
determine a sound source object in the video frame;
perform pose recognition on the sound source object to obtain pose information of the sound source object;
determine the sound source orientation based on the pose information; and
determine the sound source distance based on depth information of the sound source object.

In an exemplary embodiment, the pose information includes face pose information used for representing a face orientation. The sound source information determining module 1002 is further configured to: determine the face orientation represented by the face pose information as the sound source orientation.

In an exemplary embodiment, the video information obtaining module 1001 is configured to:
obtain a video frame sequence and an audio file of the target video, where the video frame sequence includes a plurality of video frames sequentially arranged in a time domain; and
capture, for each video frame, an audio signal in a time unit corresponding to the video frame from the audio file, to obtain the audio signal corresponding to the video frame.

Based on the above, according to the technical solutions provided in the embodiments of this disclosure, surround stereo processing is performed on the audio signal based on the sound source orientation and the sound source distance, and then scene processing is performed on the audio signal according to the echo coefficient corresponding to the scene information, to obtain an audio signal having a sound effect with surround stereo and scene, thereby enhancing a sense of reality of the sound effect and further improving the presence feeling of the user.

When the apparatus provided in the foregoing embodiments implements functions of the apparatus, the division of the foregoing functional modules is merely an example for description. In the practical application, the functions may be assigned to and completed by different functional modules according to the requirements, that is, the internal structure of the device is divided into different functional modules, to implement all or some of the functions described above. In addition, the apparatus and method embodiments provided in the foregoing embodiments belong to the same conception. For the specific implementation process, reference may be made to the method embodiments, and details are not described herein again.

The term module (and other similar terms such as unit, submodule, etc.) in this disclosure may refer to a software module, a hardware module, or a combination thereof. A software module (e.g., computer program) may be developed using a computer programming language. A hardware module may be implemented using processing circuitry and/or memory. Each module can be implemented using one or more processors (or processors and memory). Likewise, a processor (or processors and memory) can be used to implement one or more modules. Moreover, each module can be part of an overall module that includes the functionalities of the module.

Figure 12:
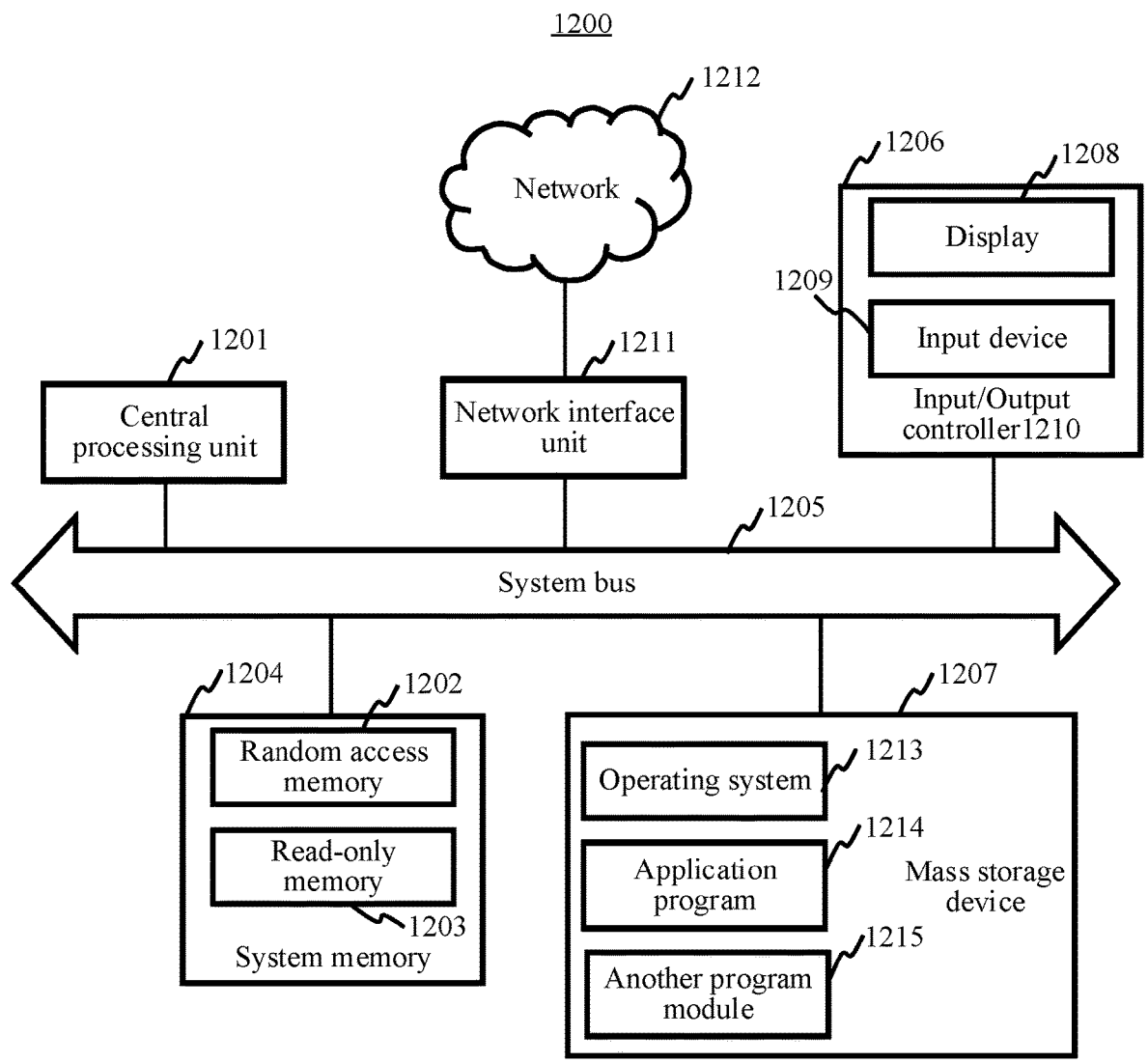
FIG. 12 is a block diagram of a computer device according to an embodiment of this disclosure.

FIG. 12 is a structural block diagram of a computer device according to an embodiment of this disclosure. The computer device may be configured to implement the sound effect adjustment method provided in the foregoing embodiments. Specifically, The computer device 1200 includes a central processing unit (CPU) 1201, a graphics processing unit (GPU), a field programmable gate array (FPGA) 1201, a system memory 1204 including a random access memory (RAM) 1202 and a read only memory (ROM) 1203, and a system bus 1205 connecting the system memory 1204 and the central processing unit 1201. The computer device 1200 further includes a basic input/output (I/O) system 1206 assisting in transmitting information between components in a server, and a mass storage device 1207 configured to store an operating system 1213, an application program 1214, and another program module 1215.

The basic I/O system 1206 comprises a display 1208 configured to display information and an input device 1209, such as a mouse or a keyboard, configured to input information for a user. The display 1208 and the input device 1209 are both connected to the CPU 1201 by using an input/output controller 1210 connected to the system bus 1205. The basic I/O system 1206 may further comprise the I/O controller 1210 configured to receive and process inputs from a plurality of other devices such as a keyboard, a mouse, or an electronic stylus. Similarly, the input/output controller 1210 further provides output to a display screen, a printer, or other types of output devices.

The large-capacity storage device 1207 is connected to the CPU 1201 by using a large-capacity storage controller (not shown) connected to the system bus 1205. The mass storage device 1207 and an associated computer-readable medium provide non-volatile storage for the computer device 1200. That is, the mass storage device 1207 may include a computer-readable medium (not shown) such as a hard disk or a compact disc read-only memory (CD-ROM) drive.

Without loss of generality, the computer-readable medium may comprise a computer storage medium and a communication medium. The computer storage medium (e.g., a non-transitory computer-readable storage medium) comprises volatile and non-volatile, removable and non-removable media that are configured to store information such as computer-readable instructions, data structures, program modules, or other data and that are implemented by using any method or technology. The computer storage medium includes a RAM, a ROM, an erasable programmable ROM (EPROM), an electrically erasable programmable ROM (EEPROM), a flash memory or another solid-state memory technology, a CD-ROM, a digital versatile disc (DVD) or another optical memory, a tape cartridge, a magnetic cassette, a magnetic disk memory, or another magnetic storage device. Certainly, a person skilled in the art can know that the computer storage medium is not limited to the foregoing several types. The foregoing system memory 1204 and mass storage device 1207 may be collectively referred to as a memory.

According to the embodiments of this disclosure, the computer device 1200 may be further connected to a remote computer on the network through a network such as the Internet to run. That is, the computer device 1200 may be connected to a network 1212 by using a network interface unit 1211 connected to the system bus 1205, or may be connected to another type of network or a remote computer system (not shown) by using a network interface unit 1211.

The memory further includes at least one instruction, at least one program, a code set, or an instruction set. The at least one instruction, the at least one program, the code set, or the instruction set is stored in the memory and is configured to be executed by one or more processors to implement the foregoing sound effect adjustment method.

In an exemplary embodiment, a computer-readable storage medium is further provided, the storage medium storing at least one instruction, at least one program, a code set, or an instruction set, the at least one instruction, the at least one program, the code set, or the instruction set, when executed by the processor, implementing the foregoing sound effect adjustment method.

In an example, the computer-readable storage medium may include: a read-only memory (ROM), a random access memory (RAM), a solid state drive (SSD), an optical disc, or the like. The RAM may include a resistance random access memory (ReRAM) and a dynamic random access memory (DRAM).

In an exemplary embodiment, a computer program product or a computer program is provided. The computer program product or the computer program includes computer instructions, and the computer instructions are stored in a computer-readable storage medium. A processor of a computer device reads the computer instructions from the computer-readable storage medium, and executes the computer instructions to cause the computer device to perform the foregoing sound effect adjustment method.

It is to be understood that "plurality of" mentioned in this specification means two or more. And/or describes an association relationship for describing associated objects and represents that three relationships may exist. For example, A and/or B may represent the following three cases: Only A exists, both A and B exist, and only B exists. The character "/" generally indicates an "or" relationship between the associated objects. In addition, the step numbers described in this specification merely schematically show a possible execution sequence of the steps. In some other embodiments, the steps may not be performed according to the number sequence. For example, two steps with different numbers may be performed simultaneously, or two steps with different numbers may be performed according to a sequence contrary to the sequence shown in the figure. This is not limited in the embodiments of this disclosure.

The foregoing descriptions are merely exemplary embodiments of this disclosure, and are not intended to limit this disclosure. Any modification, equivalent replacement, or improvement made within the spirit and principle of this disclosure shall fall within the scope of this disclosure.

What is claimed is:

1. A sound effect adjustment method, the method comprising:
    obtaining a video frame and an audio signal of a corresponding time unit of a target video;
    determining a sound source orientation and a sound source distance of a sound source object in the video frame;
    determining scene information corresponding to the video frame;
    filtering the audio signal based on the sound source orientation and the sound source distance;
    determining an echo coefficient according to the scene information; and
    generating, by processing circuitry, an adjusted audio signal with an adjusted sound effect based on the filtered audio signal and the echo coefficient.

2. The method according to claim 1, wherein the filtering the audio signal comprises:
    performing time-frequency transform on the audio signal, to obtain a frequency domain signal corresponding to the audio signal;
    determining a filter function based on the frequency domain signal, the sound source orientation, and the sound source distance; and
    filtering the audio signal with the filter function.

3. The method according to claim 2, wherein
the determining the filter function comprises:
    performing parameter adjustment on a set left channel filter function based on the frequency domain signal, the sound source orientation, and the sound source distance, to obtain an adjusted left channel filter function; and
    performing parameter adjustment on a set right channel filter function based on the frequency domain signal, the sound source orientation, and the sound source distance, to obtain an adjusted right channel filter function; and
the filtering the audio signal with the filter function comprises:
    filtering the audio signal emitted from a left channel through the adjusted left channel filter function to obtain a filtered audio signal corresponding to the left channel; and
    filtering the audio signal emitted from a right channel through the adjusted right channel filter function to obtain a filtered audio signal corresponding to the right channel.

4. The method according to claim 1, wherein the generating the adjusted audio signal comprises:
    performing echo generation on the filtered audio signal according to the echo coefficient, to obtain echo effect information; and
    generating the adjusted audio signal with the adjusted sound effect based on the echo effect information and the filtered audio signal.

5. The method according to claim 4, wherein
the echo coefficient includes a delay parameter, an amplitude parameter, and a direction parameter; and
the performing the echo generation comprises:
    determining echo delay effect information of the filtered audio signal based on the delay parameter, the echo delay effect information representing a delay effect of an echo of the target video;
    determining echo amplitude effect information of the filtered audio signal based on the amplitude parameter, the echo amplitude effect information representing a loudness attenuation effect of the echo of the target video; and
    determining echo direction effect information of the filtered audio signal based on the direction parameter, the echo direction effect information representing a direction effect of the echo of the target video.

6. The method according to claim 5, wherein the generating the adjusted audio signal with the adjusted sound effect based on the echo effect information and the filtered audio signal comprises:
    generating an echo audio signal corresponding to the filtered audio signal based on the echo delay effect information, the echo amplitude effect information, and the echo direction effect information; and
    superimposing the echo audio signal on the filtered audio signal to generate the adjusted audio signal with the adjusted sound effect.

7. The method according to claim 1, wherein the determining the echo coefficient comprises:
    obtaining depth information of the sound source object in the video frame;
    obtaining a set echo coefficient corresponding to the scene information based on a preset correspondence, the preset correspondence including a correspondence between at least one group of scene information and the set echo coefficient; and
    fine-tuning the set echo coefficient corresponding to the scene information based on the depth information to obtain the echo coefficient.

8. The method according to claim 7, wherein the fine-tuning the set echo coefficient comprises:
    determining a distance and an angle between the sound source object in the video frame and each pixel in a picture content corresponding to the video frame based on the depth information; and
    fine-tuning the set echo coefficient corresponding to the scene information based on the distance and the angle, to obtain the echo coefficient.

9. The method according to claim 1, wherein the determining the sound source orientation and the sound source distance comprises:
    determining the sound source object in the video frame;
    performing pose recognition on the sound source object to obtain pose information of the sound source object;
    determining the sound source orientation based on the pose information; and
    determining the sound source distance based on depth information of the sound source object.

10. The method according to claim 9, wherein
the pose information includes face pose information that represents a face orientation; and the determining the sound source orientation based on the pose information includes determining the face orientation represented by the face pose information as the sound source orientation.

11. The method according to claim 1, wherein, the obtaining the video frame and the audio signal comprises:
obtaining a video frame sequence and an audio file of the target video, the video frame sequence including a plurality of video frames sequentially arranged in a time domain; and
capturing, for each video frame, an audio signal in a time unit corresponding to the respective video frame from the audio file, to obtain the audio signal corresponding to the respective video frame.

12. The method according to claim 1, wherein the scene information indicates an environment of the sound source object.

13. A sound effect adjustment apparatus, comprising:
processing circuitry configured to:
obtain a video frame and an audio signal of a corresponding time unit of a target video;
determine a sound source orientation and a sound source distance of a sound source object in the video frame;
determine scene information corresponding to the video frame;
filter the audio signal based on the sound source orientation and the sound source distance;
determine an echo coefficient according to the scene information; and
generate an adjusted audio signal with an adjusted sound effect based on the filtered audio signal and the echo coefficient.

14. The sound effect adjustment apparatus according to claim 13, wherein the processing circuitry is configured to:
perform time-frequency transform on the audio signal, to obtain a frequency domain signal corresponding to the audio signal;
determine a filter function based on the frequency domain signal, the sound source orientation, and the sound source distance; and
filter the audio signal with the filter function.

15. The sound effect adjustment apparatus according to claim 14, wherein the processing circuitry is configured to:
perform parameter adjustment on a set left channel filter function based on the frequency domain signal, the sound source orientation, and the sound source distance, to obtain an adjusted left channel filter function;
perform parameter adjustment on a set right channel filter function based on the frequency domain signal, the sound source orientation, and the sound source distance, to obtain an adjusted right channel filter function;
filter the audio signal emitted from a left channel through the adjusted left channel filter function to obtain a filtered audio signal corresponding to the left channel; and
filter the audio signal emitted from a right channel through the adjusted right channel filter function to obtain a filtered audio signal corresponding to the right channel.

16. The sound effect adjustment apparatus according to claim 13, wherein the processing circuitry is configured to:
perform echo generation on the filtered audio signal according to the echo coefficient, to obtain echo effect information; and
generate the adjusted audio signal with the adjusted sound effect based on the echo effect information and the filtered audio signal.

17. The sound effect adjustment apparatus according to claim 16, wherein
the echo coefficient includes a delay parameter, an amplitude parameter, and a direction parameter; and
the processing circuitry is configured to:
determine echo delay effect information of the filtered audio signal based on the delay parameter, the echo delay effect information representing a delay effect of an echo of the target video;
determine echo amplitude effect information of the filtered audio signal based on the amplitude parameter, the echo amplitude effect information representing a loudness attenuation effect of the echo of the target video; and
determine echo direction effect information of the filtered audio signal based on the direction parameter, the echo direction effect information representing a direction effect of the echo of the target video.

18. The sound effect adjustment apparatus according to claim 17, wherein the processing circuitry is configured to:
generate an echo audio signal corresponding to the filtered audio signal based on the echo delay effect information, the echo amplitude effect information, and the echo direction effect information; and
superimpose the echo audio signal on the filtered audio signal to generate the adjusted audio signal with the adjusted sound effect.

19. The sound effect adjustment apparatus according to claim 13, wherein the processing circuitry is configured to:
obtain depth information of the sound source object in the video frame;
obtain a set echo coefficient corresponding to the scene information based on a preset correspondence, the preset correspondence including a correspondence between at least one group of scene information and the set echo coefficient; and
fine-tune the set echo coefficient corresponding to the scene information based on the depth information to obtain the echo coefficient.

20. A non-transitory computer-readable storage medium storing instructions which when executed by a processor cause the processor to perform:
obtaining a video frame and an audio signal of a corresponding time unit of a target video;
determining a sound source orientation and a sound source distance of a sound source object in the video frame;
determining scene information corresponding to the video frame;
filtering the audio signal based on the sound source orientation and the sound source distance;
determining an echo coefficient according to the scene information; and
generating an adjusted audio signal with an adjusted sound effect based on the filtered audio signal and the echo coefficient.

* * * * *